United States Patent
Kuwabara

(10) Patent No.: US 11,427,080 B2
(45) Date of Patent: Aug. 30, 2022

(54) POWER TRANSMISSION DEVICE FOR FOUR-WHEEL DRIVE VEHICLE

(71) Applicant: Nissan Motor Co., Ltd., Yokohama (JP)

(72) Inventor: Takahiro Kuwabara, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 363 days.

(21) Appl. No.: 16/651,405

(22) PCT Filed: Oct. 24, 2017

(86) PCT No.: PCT/JP2017/038274
§ 371 (c)(1),
(2) Date: Mar. 27, 2020

(87) PCT Pub. No.: WO2019/082258
PCT Pub. Date: May 2, 2019

(65) Prior Publication Data
US 2020/0298699 A1 Sep. 24, 2020

(51) Int. Cl.
*B60K 6/405* (2007.10)
*B60K 17/344* (2006.01)
(Continued)

(52) U.S. Cl.
CPC ........ *B60K 17/344* (2013.01); *B60K 23/0808* (2013.01); *B60K 17/35* (2013.01);
(Continued)

(58) Field of Classification Search
CPC .. B60K 17/344; B60K 23/0808; B60K 17/35; B60K 2023/0833; B60K 6/442; B60K 2023/0858; B60K 1/00; B60K 5/04; B60K 6/405; B60K 6/46; B60K 6/52; B60K 6/547; B60K 17/356; B60Y 2400/424; B60Y 2400/82; B60Y 2200/92; B60Y 2410/10; F16D 2500/10431; Y02T 10/62
See application file for complete search history.

(56) References Cited

U.S. PATENT DOCUMENTS 4,470,476 A * 9/1984 Hunt ................ B60L 8/003
60/718
2016/0039405 A1 2/2016 Terayama et al.

FOREIGN PATENT DOCUMENTS

DE 102004015271 A1 * 10/2004 ......... F16D 25/0638
DE 102014213663 A1 * 1/2015 ............. B60K 23/08
(Continued)

*Primary Examiner* — Justin Holmes
(74) *Attorney, Agent, or Firm* — Global IP Counselors, LLP

(57) ABSTRACT

A power transmission device of a four-wheel drive electrically driven vehicle comprises a transverse engine that is supported on one right side surface of two side surfaces of the gear case, and a motor that is supported on the other left side surface of the two side surfaces of the gear case. The power transmission device includes a transfer case that is supported by a gear case and the distributes power from a power source between the left and right front wheels and the left and right rear wheels. The transfer case wraps around from the side surface to a rear surface of the gear case, as seen from above, and outputs power to the left and right rear wheels from the rear surface side of the gear case.

11 Claims, 10 Drawing Sheets

(51) Int. Cl.
  *B60K 23/08* (2006.01)
  *B60K 17/35* (2006.01)
(52) U.S. Cl.
  CPC . *B60K 2023/0833* (2013.01); *B60Y 2400/424* (2013.01); *B60Y 2400/82* (2013.01); *F16D 2500/10431* (2013.01)

(56) References Cited

FOREIGN PATENT DOCUMENTS

| | | |
|---|---|---|
| EP | 0 995 623 A1 | 4/2000 |
| JP | 2000-190751 A | 7/2000 |
| JP | 2000-335263 A | 12/2000 |
| JP | 2008-110748 A | 5/2008 |
| JP | 2010-89556 A | 4/2010 |
| JP | 2012-187954 A | 10/2012 |
| JP | 2013-96511 A | 5/2013 |
| WO | WO-2015119128 A1 * | 8/2015 ............... B60K 6/48 |

* cited by examiner

US 11,427,080 B2

POWER TRANSMISSION DEVICE FOR FOUR-WHEEL DRIVE VEHICLE

CROSS-REFERENCE TO RELATED APPLICATIONS

This application is a U.S. national stage application of International Application No. PCT/JP2017/038274, filed on Oct. 24, 2017.

BACKGROUND

Technical Field

The present disclosure relates to a power transmission device of a four-wheel drive vehicle comprising a transfer case that is supported by a gear case and that distributes power from a power source to the main drive wheels and the auxiliary drive wheels.

Background Information

A power transmission structure of a four-wheel drive vehicle equipped with a transfer case (the power distribution mechanism 1) that is mechanically connected to one power source (the engine 13) via a transmission (the transmission 7) is known (for example, refer to Japanese Laid-Open Patent Application No. 2008-110748).

SUMMARY

In the conventional device described above, the transfer case (the power distribution mechanism 1) is located on the same one of the two side surface of the transmission housing on which the power source (the engine 13) is supported. As a result of this layout arrangement, the transfer output shaft of the transfer case (the power distribution mechanism 1) is located essentially at the center in the vehicle width direction, and the propeller shaft can be disposed in the floor tunnel.

However, in recent years, as an increasing number of vehicles are being electrified, it is conceivable to add an electric motor as a power source. If a layout in which the electric motor is disposed on the "opposite side" of the engine with respect to the transmission housing is selected, the center location of the engine, the transmission housing, and the electric motor in the vehicle width direction moves from the center location that was established before the electric motor was added. Therefore, if the transfer case is arranged in the same manner as in the conventional device, the location of the transfer output shaft shifts from the center in the vehicle width direction, which creates the problem that the propeller shaft cannot be disposed in the floor tunnel.

In view of the problem described above, the object of the present disclosure is to make it possible to locate the transfer output shaft at essentially the center in the vehicle width direction and to avoid the inability to locate the propeller shaft in the floor tunnel.

In order to achieve the object described above, the present disclosure is provided with a transfer case that is supported by a gear case and that distributes power from a power source to the main drive wheels and the auxiliary drive wheels.

This power transmission device of a four-wheel drive vehicle comprises an engine that is supported on one of two side surfaces of the gear case, and an electric motor that is supported on the other side surface of the two side surfaces of the gear case.

The transfer case wraps around from the side surface to the rear surface of the gear case as seen from above, and outputs power to the auxiliary drive wheels from the rear side of the gear case.

In this manner, by setting the transfer case output to the rear side of the gear case by wrapping around from the side surface to the rear surface of the gear case, as seen from above, it is possible to position the transfer output shaft at essentially the center position in the vehicle width direction, and to avoid the inability of locating the propeller shaft in the floor tunnel.

DETAILED DESCRIPTION OF THE EMBODIMENTS

Figure 1:
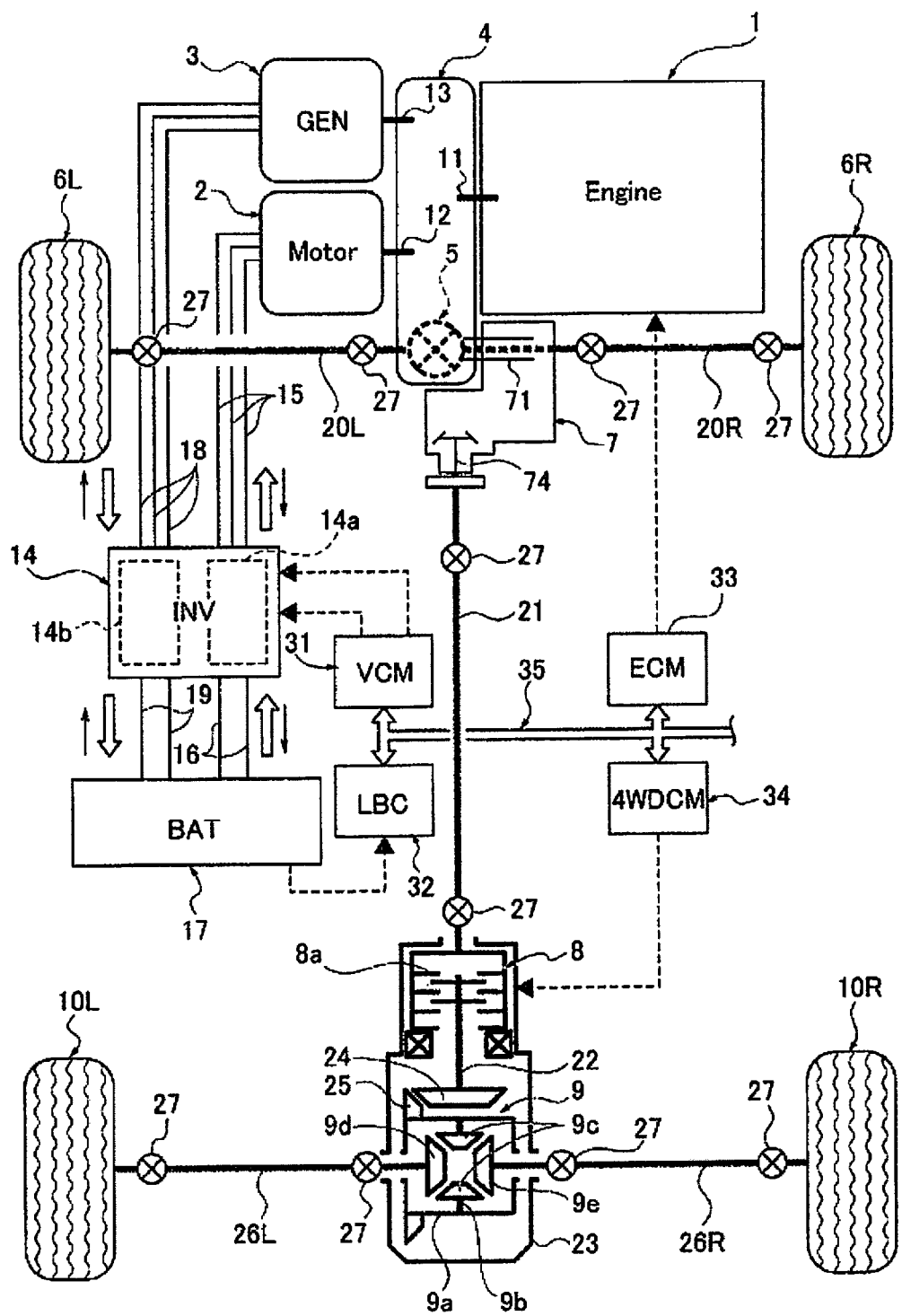
FIG. 1 is an overall system view that shows an FF-based four-wheel drive electrically driven vehicle (one example of a four-wheel drive vehicle) to which is applied a power transmission device according to a first embodiment.

A preferred embodiment for realizing a power transmission device of a four-wheel drive vehicle according to the present disclosure will be described below based on first and second embodiments shown in the drawings.

First Embodiment

The configuration is described first. The power transmission device according to the first embodiment is applied to an FF-based four-wheel drive electrically driven vehicle (one example of a four-wheel drive vehicle) that has an engine as a power source for power generation and a motor as a power source for traveling, and that uses the electrical power generated by the engine to drive the motor. The "overall system configuration," the "layout configuration of the front-side power transmission system" the "detailed configuration of the gear case," and the "detailed configuration of the transfer case" will be separately described below with respect to the configuration of the first embodiment.

Overall System Configuration

FIG. 1 illustrates an FF-based four-wheel drive electrically driven vehicle to which the power transmission device according to the first embodiment is applied. The overall system configuration of the four-wheel drive electrically driven vehicle will be described below, with reference to FIG. 1.

As shown in FIG. 1, a front-wheel drive system of a four-wheel drive electrically driven vehicle is provided with a transverse engine 1 (a first power source), a motor 2 (a second power source), a generator 3, a gear case 4, a front differential 5, and left and right front wheels 6L, 6R (main drive wheels). As shown in FIG. 1, a rear-wheel drive system is provided with a transfer case 7, an electronically controlled coupling 8, a rear differential 9, and left and right rear wheels 10L, 10R (auxiliary drive wheels).

The transverse engine 1 is supported by the gear case 4 and is horizontally disposed so that engine crankshaft 11 is oriented in the vehicle width direction. The transverse engine 1 is mounted as a power source for power generation that drives the generator 3.

The motor 2 is supported by the gear case 4 and is horizontally disposed so that motor shaft 12 is oriented in the vehicle width direction. The motor 2 is a three-phase AC, permanent magnet-type synchronous motor that primarily functions as a power source for travel.

A motor inverter 14a of an inverter unit 14 is connected to the stator coil of the motor 2 by means of an AC harness 15. A lithium-ion battery 17 is connected to the motor inverter 14a by means of a DC harness 16. At the time power is supplied by the motor 2, the motor inverter 14a converts DC electrical energy from the lithium-ion battery 17 into three-phase AC electrical energy and generates driving torque for starting travel, constant-speed travel, and accelerating travel (a power source for travel function). At the time of regeneration by the motor 2, the motor inverter 14a converts the three-phase AC electric energy generated in the motor 2 into DC for storage in the lithium-ion battery 17, recharging the lithium-ion battery 17 while resistive loading from the negative regenerative torque is applied to reduce the speed (a deceleration power generation function.

The generator 3 is supported by the gear case 4 and is arranged horizontally such that generator shaft 13 is oriented in the vehicle width direction. The generator 3 is a three-phase AC, permanent magnet type synchronous motor that primarily functions as a power generation source.

A generator inverter 14b of the inverter unit 14 is connected to the stator coil of the generator 3 by means of an AC harness 18. A lithium-ion battery 17 is connected to the generator inverter 14b by means of a DC harness 19. At the time of generator regeneration by operation of the transverse engine 1, the generator inverter 14b converts the three-phase AC electrical energy generated by the generator 3 into DC electrical energy and charges the lithium-ion battery 17 (a power generation function). When the generator 3 is in operation, the generator inverter 14b converts the DC electrical energy from the lithium-ion battery 17 into three-phase AC electrical energy and driving torque is output for starting the transverse engine 1 (an engine starting function).

Here, the inverter unit 14 is disposed in an empty space region above the motor 2 and the generator 3. With regard to a floor panel of a passenger space, the lithium-ion battery 17 is disposed at a rear surface position of the floor panel in the seat area where the passenger seat is installed.

The gear case 4 has the front differential 5. The front differential 5 has a left-side gear 5d to which a left front drive shaft 20L extending to a left front wheel 6L is connected, and a right-side gear 5e to which a right front drive shaft 20R extending to a right front wheel 6R is connected (refer to FIG. 3).

The transfer case 7 is supported on the same side surface of the gear case 4 (a right side surface) on which the transverse engine 1 is supported. A transfer input shaft 71 of the transfer case 7 is connected to a differential case 5a of the front differential 5 (refer to FIG. 3). A first rear propeller shaft 21, disposed essentially at the center in the vehicle width direction, is connected to a transfer output shaft 74 of the transfer case 7 and extends toward the rear of the vehicle.

The electronically controlled coupling 8 is located between the first rear propeller shaft 21 and a second rear propeller shaft 22 and next to the rear differential 9. The electronically controlled coupling 8 has a built-in multi-plate friction clutch 8a and transmits power from the motor 2 to a left rear wheel 10L and a right rear wheel 10R with the electronically controlled clutch engagement torque as the maximum transmission torque. The electronically controlled coupling 8 and the rear differential 9 are incorporated inside a common housing 23.

The rear differential 9 includes a differential case 9a, a pinion shaft 9b, a pinion gear 9c, a left-side gear 9d, and a right-side gear 9e. A ring gear 25 that meshes with an input gear 24, provided at an end portion of the second rear propeller shaft 22, is fixed to the differential case 9a. The pinion gear 9c is rotatably supported by the pinion shaft 9b, which is supported by the differential case 9a. The left-side gear 9d and the right-side gear 9e mesh with the pinion gear 9c from the left and right sides, respectively. A left rear drive shaft 26L is connected to the left-side gear 9d, and a right rear drive shaft 26R is connected to the right-side gear 9e. Reference numeral 27 in FIG. 1 indicates a joint provided on each shaft 20L, 20R, 21, 26L, and 26R.

As shown in FIG. 1, the electronic control system of the four-wheel drive electrically driven vehicle comprises a vehicle control module 31, a lithium-ion battery controller 32, an engine control module 33, and a 4WD control module 34. These control devices 31, 32, 33, 34 are connected by means of a CAN communication line 35 (here, CAN is an acronym for "Controller Area Network") that is capable of bidirectional information exchange.

The vehicle control module 31 (acronym: "VCM") is an integrated control means that suitably manages the energy consumption of the entire vehicle. For example, the accelerator opening degree, vehicle speed, and the like, are input to this module. Then, when the accelerator opening degree exceeds a prescribed opening degree, the vehicle control module outputs a command to the inverter 14 to carry out power control of the motor 2 in accordance with the accelerator opening degree. When the accelerator opening degree is less than or equal to the prescribed opening degree, the vehicle control module outputs a command to the inverter 14 to carry out regenerative control of the motor 2 in accordance with the accelerator opening degree. In addition, when a charge request from the lithium-ion battery controller 32 is input, the vehicle control module starts the transverse engine 1 with the generator 3 and outputs a control command to the inverter 14 to shift to power generation. When a charge-stop request from the lithium-ion battery controller 32 is input, the vehicle control module outputs a control command to the inverter 14 to stop the power generation by the generator 3.

The lithium-ion battery controller 32 (acronym: "LBC") manages the battery temperature and the battery SOC of the lithium-ion battery 14, and the like. For example, when the battery SOC drops below a threshold value, the lithium-ion battery controller outputs a charge request to the vehicle control module 31 and the engine control module 33. When the battery SOC becomes greater than or equal to the threshold value, the lithium-ion battery controller outputs a charge-stop request to the vehicle control module 31 and the engine control module 33.

The engine control module 33 (acronym: "ECM") controls the engine start/engine stop, etc., by means of a control command to the transverse engine 1. For example, when a charge request from the lithium-ion battery controller 32 is input, the engine control module outputs an engine start command to the transverse engine 1 during cranking by the generator 3. When a charge-stop request from the lithium-ion battery controller 32 is input, the engine control module outputs an engine-stop command to the transverse engine 1.

The 4WD control module 34 (acronym: "4WDCM") controls the power distribution ratio between the left and right front wheels 6L, 6R and the left and right rear wheels 10L, 10R by means of a control command to the electronically controlled coupling 8. For example, the 4WD control module 34 inputs signals from a 4WD mode switch, a wheel speed sensor, a steering angle sensor, a yaw rate sensor, a G sensor, a brake switch, etc. Then, after carrying out a prescribed calculation process, the 4WD control module outputs a transmission torque command value to an electromagnetic actuator of the electronically controlled coupling 8, or the like. For example, when auto (AUTO) is selected by means of the 4WD mode switch, the 4WD control module calculates a torque command value by means of an initial torque process, a torque command value by means of a differential rotation torque process, and a torque command value by means of a driving force distribution torque process. The 4WD control module then selects the final transmission torque command value by finding the highest of the calculated torque command values, and controls the driving force distribution ratio. When the multi-plate friction clutch 8a of the electronically controlled coupling 8 is disengaged, the front and rear wheel driving force distribution ratios are controlled to be in 2WD mode by means of a front-wheel drive distribution, with a front-wheel distribution ratio of 100%:rear-wheel distribution ratio of 0%. When the multi-plate friction clutch 8a of the electronically controlled coupling 8 is completely engaged, full 4WD mode is achieved through an equal front and rear wheel drive distribution, with a front wheel distribution ratio of 50%:rear wheel distribution ratio of 50%. That is, front and rear wheel driving force distribution ratios of (front wheel distribution ratio of 100% to 50%):(rear wheel distribution ratio of 0% to 50%) can be achieved in a stepless manner by controlling the clutch engagement capacity of the multi-plate friction clutch 8a.

Layout Configuration of the Front-Side Power Transmission System

Figure 2:
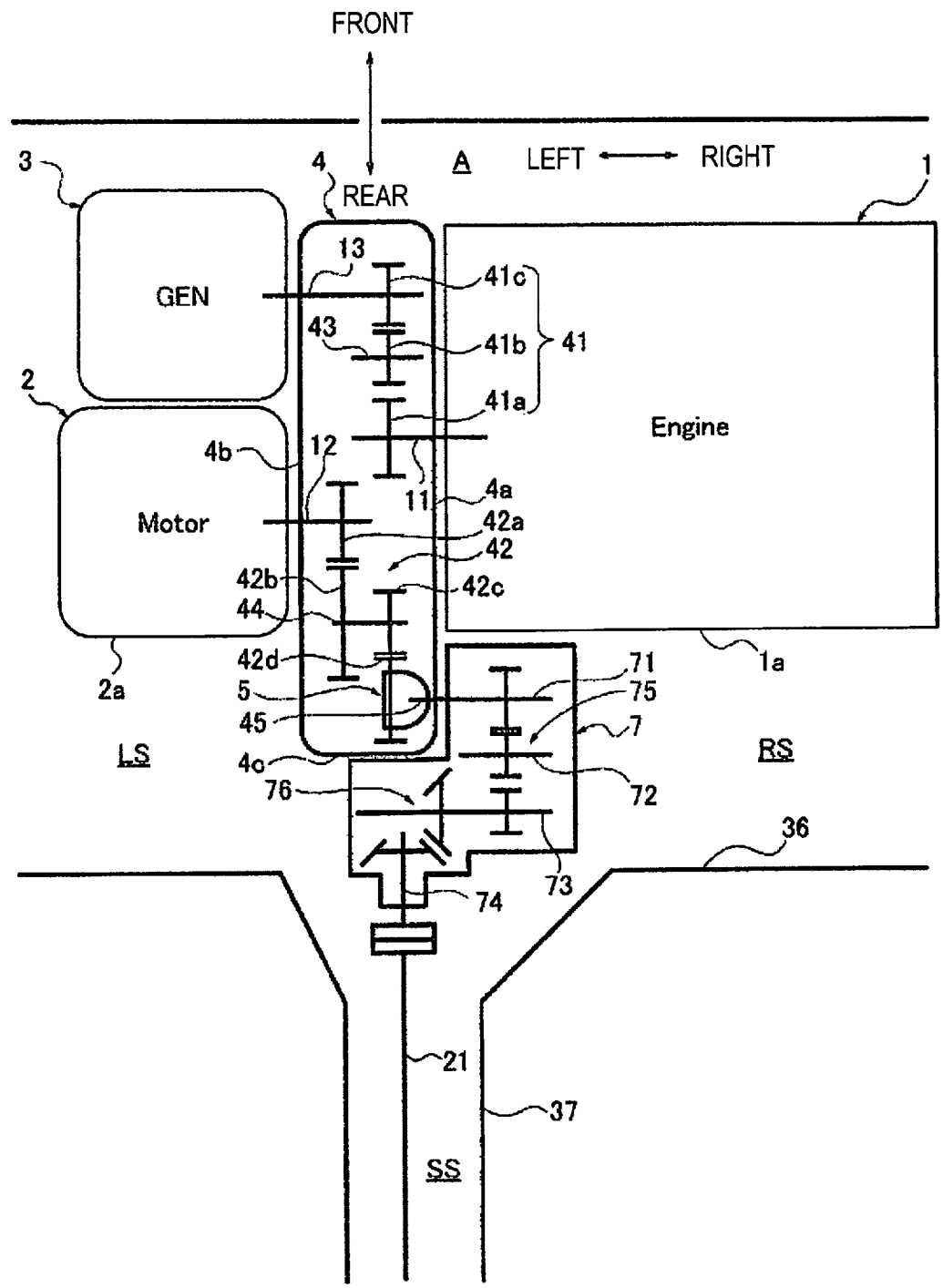
FIG. 2 is a skeleton diagram that shows a layout configuration of a front-side power transmission system of the first embodiment.

FIG. 2 shows a layout configuration of a front-side power transmission system in the first embodiment. The layout configuration of the front-side power transmission system will be described below with reference to FIG. 2.

As shown in FIG. 2, the front-side power transmission system includes the transverse engine 1, the motor 2, the generator 3, the gear case 4, the front differential 5, and the transfer case 7, which are arranged in a front power unit room A.

The transverse engine 1 is supported on the right side surface 4a of the two side surfaces 4a, 4b of the gear case 4 in the right-side space region of the front power unit room A and is arranged horizontally such that the engine crankshaft 11 is oriented along the vehicle width direction.

The motor 2 is supported on the left side surface 4b of the two side surfaces 4a, 4b of the gear case 4 in the left-side space region of the front power unit room A and is arranged horizontally such that the motor shaft 12 is oriented along the vehicle width direction. The motor 2 is smaller than the transverse engine 1 in the vehicle width direction (the dimension of engine in the vehicle width direction>the dimension of motor in the vehicle width direction).

The generator 3 is supported on the left side surface 4b of the two side surfaces 4a, 4b of the gear case 4 in the left-side space region of the front power unit room A in a position adjacent to and in front of and below the motor 2 with respect to the vehicle and is arranged horizontally such that the generator shaft 13 is oriented in the vehicle width direction. The generator 3 is smaller than the motor dimension of the motor 2 in the vehicle width direction (the motor dimension in the vehicle width direction>the dimension of generator in the vehicle width direction).

The gear case 4 is arranged in a central space region of the front power unit room A, interposed between the transverse engine 1 on side surfaces 4a, and the motor 2 and generator 3 on side surface 4b. As shown in FIG. 2, the gear case 4, in a plan view, has the form of a rectangle with the short side in the width direction of the vehicle and the long side in the longitudinal direction of the vehicle. The vehicle rearward portion of the gear case 4, which includes the front differential 5, projects farther toward the rear of the vehicle than the vehicle rearward end surfaces 1a, 2a of the transverse engine 1 and the motor 2, respectively. The portions of the gear case 4 that project toward the rearward side of the vehicle, i.e., the right side surface 4a, and the left side surface 4b and a rear surface 4c (a vehicle rearward side surface) on which the transfer case 7 is disposed, form an exposed portion.

In a top view, the transfer case 7 is supported by the gear case 4 by wrapping around the left side surface 4b of the two side surfaces 4a, 4b of the gear case on which the motor 2 and the generator 3 are supported, from the left side surface 4b to the rear surface 4c of the exposed portion of the gear case 4. The transfer output shaft 74 then outputs power from the rear surface 4c of the gear case 4 to the left and right rear wheels 10L, 10R via the first propeller shaft 21 in the longitudinal direction of the vehicle.

In this manner, since a layout configuration of the front-side power transmission system is employed in which the transfer case 7 is supported by the gear case 4 by wrapping around from the right side surface 4a to the rear surface 4c, as seen from above, the following spaces are provided.

(A) A right-side space RS, surrounded by a vehicle-rear end surface 1a of the transverse engine 1, a dash panel 36, and a right-side vehicle body panel, not shown, is provided.

(B) A left-side space LS, surrounded by a vehicle-rear end surface 2a of the motor 2, a dash panel 36, and a left-side vehicle body panel, not shown, is provided.

(C) A shaft space SS, in which the first propeller shaft 21 is disposed, is provided in a floor tunnel 37 extending in the longitudinal direction of the vehicle at essentially the central area in the vehicle width direction.

Detailed Configuration of the Gear Case

Figure 3:
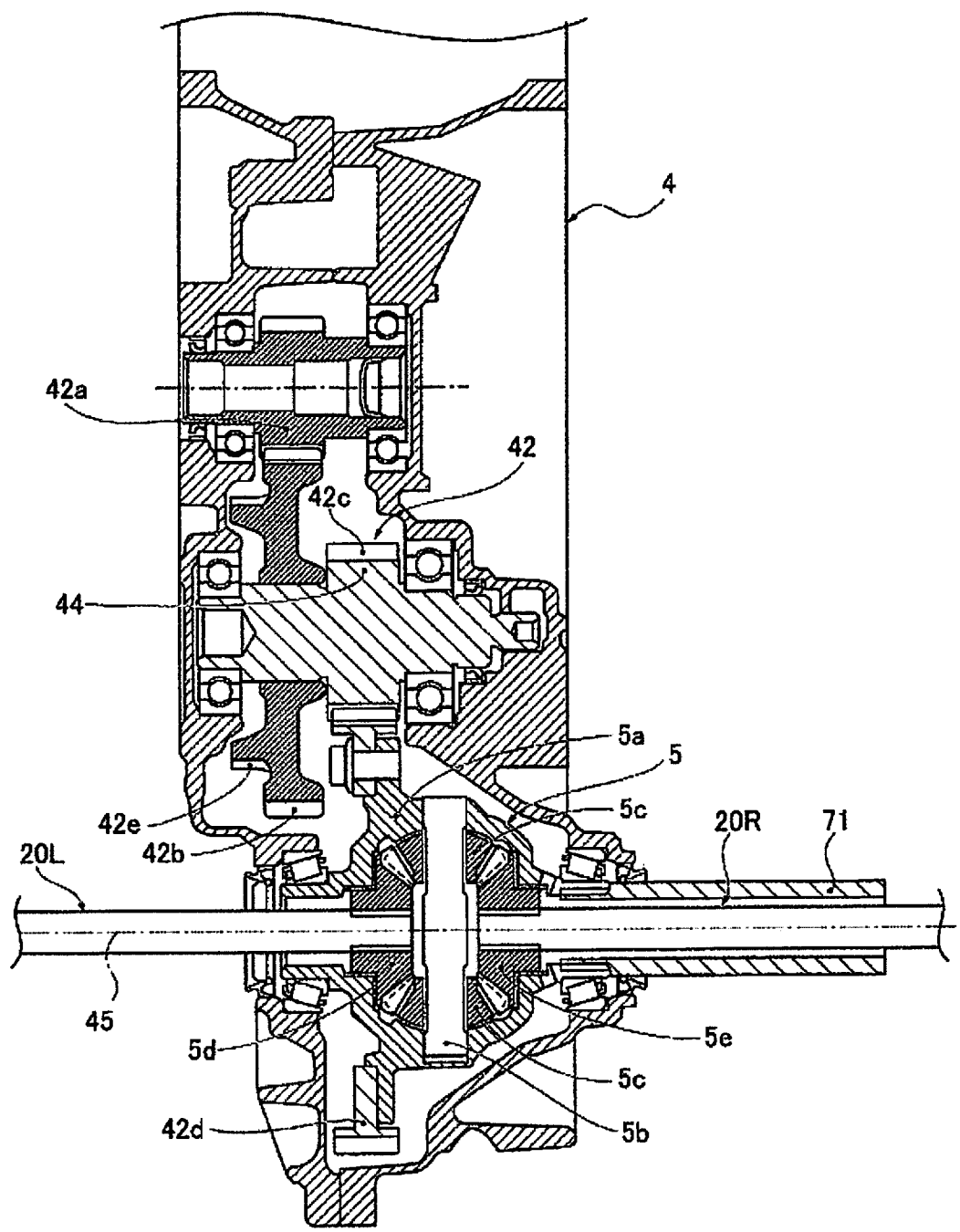
FIG. 3 is a cross-sectional view of a gear case that shows a configuration of a front differential and a reduction gear mechanism incorporated in a gear case in the power transmission device according to the first embodiment.

FIG. 3 shows a configuration of the front differential 5 and a reduction gear mechanism 42 incorporated in the gear case 4. The detailed configuration of the gear case 4 will be described below, with reference to FIGS. 2 and 3.

As shown in FIGS. 2 and 3, the gear case 4 has a speed-increasing gear mechanism 41, the reduction gear mechanism 42, and the front differential 5.

The speed-increasing gear mechanism 41 is a gear train that connects the transverse engine 1 and the generator 3, and is configured by an intermeshing engine gear 41a, idler gear 41b, and generator gear 41c, as shown in FIG. 2.

The engine gear 41a is provided at an end position of the engine crankshaft 11. The idler gear 41b is provided on an idler shaft 43, which is supported at both ends so as to be rotatable with respect to the gear case 4. The generator gear 41c is provided at an end position of the generator shaft 13. The three shafts, the engine crankshaft 11, the idler shaft 43, and the generator shaft 13, are arranged parallel to each other.

Figure 4:
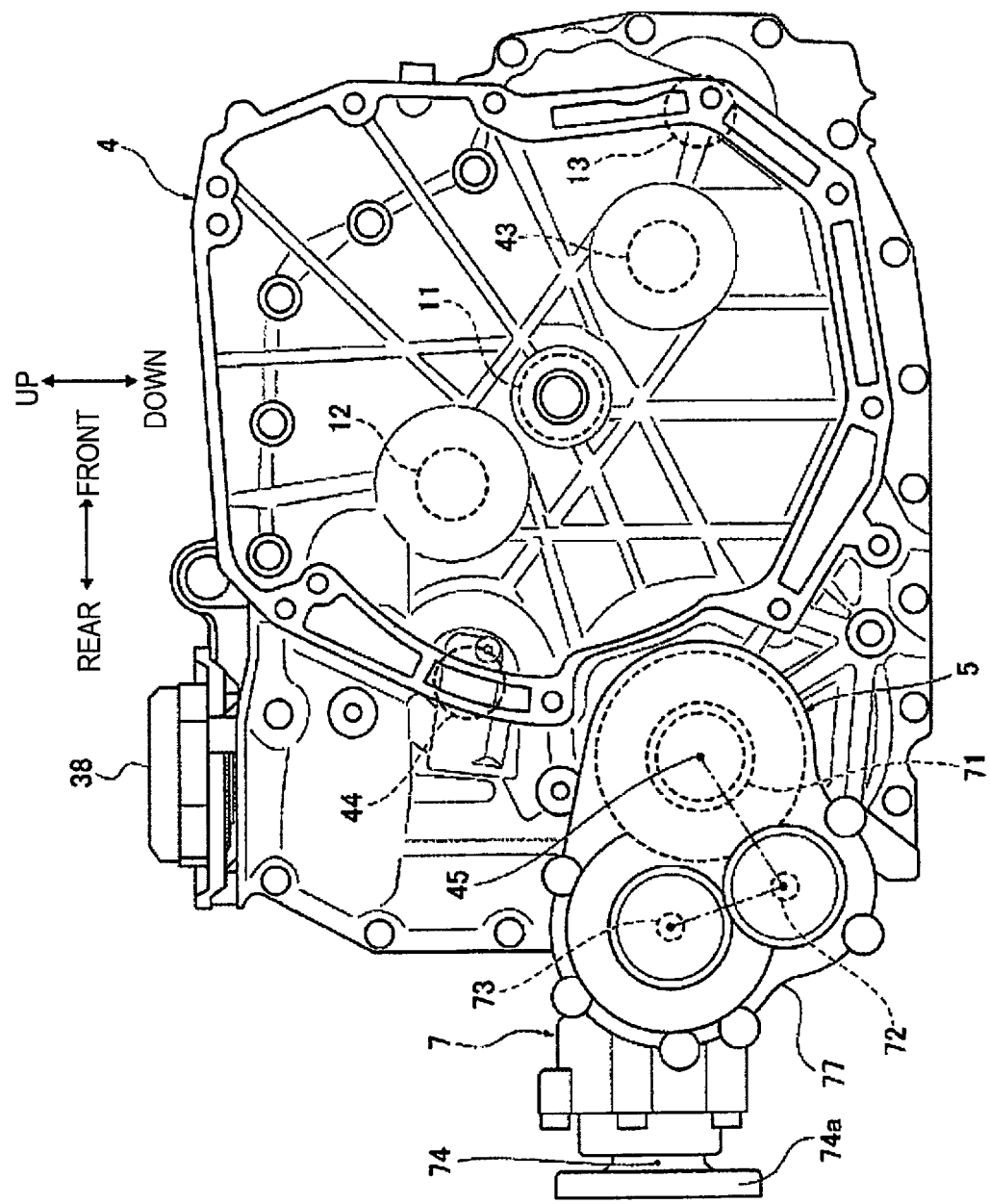
FIG. 4 is a side view of a transfer case and the gear case that shows the transfer case supported by the gear case in the power transmission device according to the first embodiment.

Here, in FIG. 2, which is an unfolded plan view, the three shafts, the engine crankshaft 11, the idler shaft 43, and the generator shaft 13, are shown located at the same height. However, as shown in FIG. 4, the engine crankshaft 11 is arranged at a central portion of the gear case 4. As shown in FIG. 4, the idler shaft 43 and the generator shaft 13 are disposed at lower side positions that are more forward in the vehicle than the engine crankshaft 11.

The relationship between the gear diameters of the speed-increasing gear mechanism 41 is such that the engine gear diameter>generator gear diameter, and when electrical power is generated by the generator 3 by means of the operation of the transverse engine 1, a speed-increasing gear ratio is set. On the other hand, when the transverse engine 1 is started by the generator 3, a reduction gear ratio is set.

The reduction gear mechanism 42 is a gear train that connects the motor 2 and the front differential 5 and is configured by an intermeshing motor gear 42a and first idler gear 42b, and an intermeshing second idler gear 42c and ring gear 42d, as shown in FIGS. 2 and 3.

The motor gear 42a is provided at an end position of the motor shaft 12, which is supported at both ends so as to be rotatable with respect to the gear case 4. The first idler gear 42b and the second idler gear 42c are provided adjacent to an idler shaft 43, which is supported at both ends so as to be rotatable with respect to the gear case 4. The ring gear 42d is connected at an outer circumferential position of the differential case 5a of the front differential 5. The three axes, the axis of the motor shaft 12, the axis of the idler shaft 43 and the axis of rotation 45 of the front differential 5, are arranged parallel to each other. As shown in FIG. 3, a parking gear 42e is formed integrally on a side portion of the first idler gear 42b, so that a parking pawl engages when the parking range position is selected.

The relationship between the gear diameters of the reduction gear mechanism 42 is such that the motor gear diameter<ring gear diameter, and when the motor 2 is driven to rotate, the reduction gear ratio is set. On the other hand, during regenerative power generation by the motor 2, the speed-increasing gear ratio is set.

Here, in FIG. 3, which is an unfolded plan view, the three axes, the axis of the motor shaft 12, the axis of the idler shaft 43, and the axis of rotation 45 of the front differential 5, are shown located at the same height. However, as shown in FIG. 4, the motor shaft 12 and the idler shaft 43 are disposed more toward the rear of the vehicle than the engine crankshaft 11, in an upper area of the gear case 4. As shown in FIG. 4, the axis of rotation 45 of the front differential 5 is disposed lower and more toward the rear of the vehicle than the idler shaft 43, in a lower position of the gear case 4.

As shown in FIG. 3, the front differential 5 includes the differential case 5a, a pinion shaft 5b, a pinion gear 5c, the left-side gear 5d, and the right-side gear 5e. A ring gear 42d that meshes with the second idler gear 42c, provided on the idler shaft 43, is fixed to an outer circumferential position of the differential case 5a. The pinion gear 5c is rotatably supported by the pinion shaft 5b, which is supported by the differential case 5a. The left-side gear 5d and the right-side gear 5e engage with the pinion gear 9c from the left and right sides, respectively. A left front drive shaft 20L is connected to the left-side gear 5d, and a right front drive shaft 20R is connected to the right-side gear 5e.

As shown in FIG. 3, the transfer input shaft 71 of the transfer case 7 is integrally provided on the right-side end position of the differential case 5a of the front differential 5 by means of spline connection, or the like. That is, the differential case 5a of the front differential 5 functions as a branch member for distributing power from the motor to the left and right front wheels 6L, 6R and the left and right rear wheels 10L, 10R.

Detailed Configuration of the Transfer Case

Figure 5:
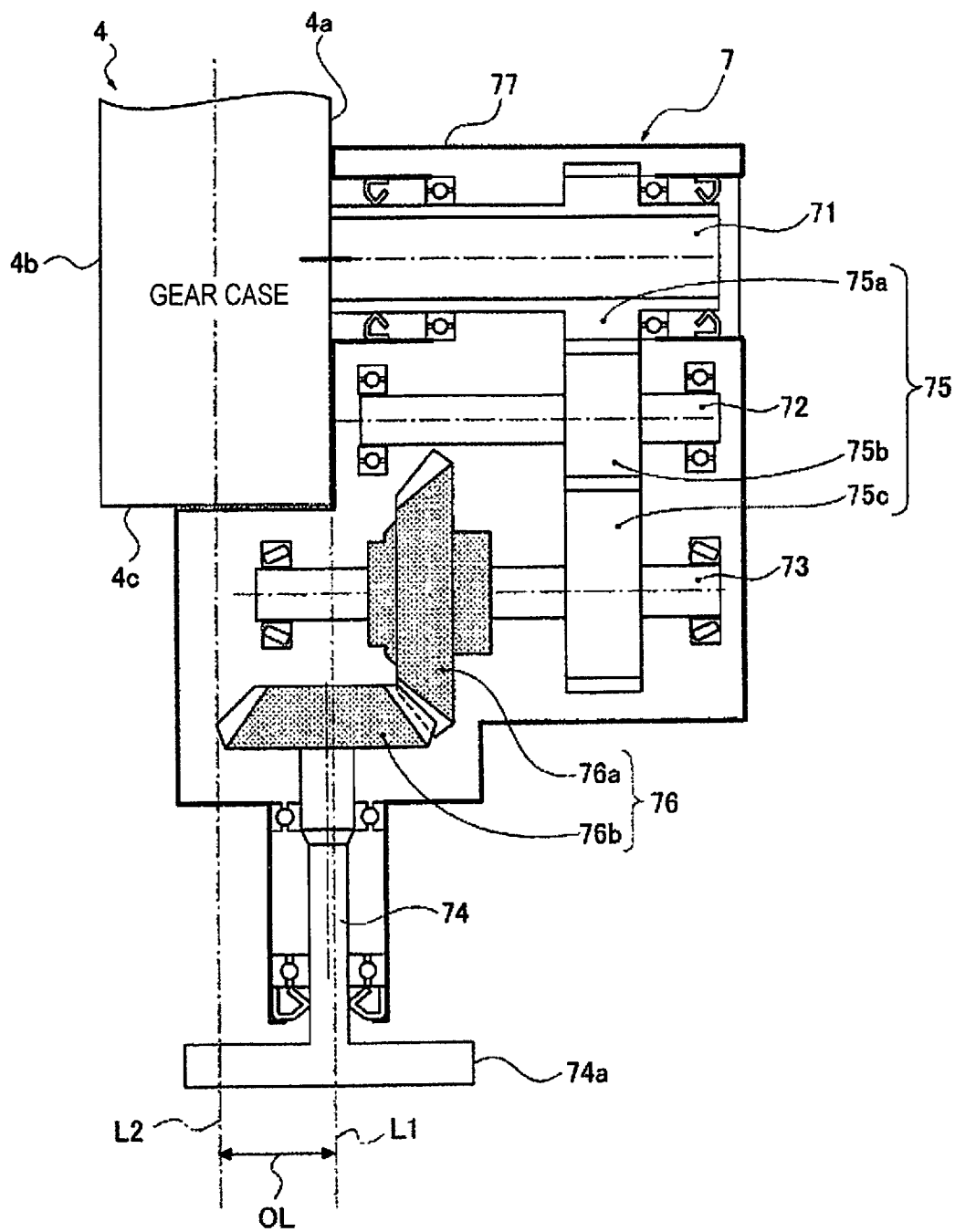
FIG. 5 is a cross-sectional view of the transfer case that shows a detailed configuration of the transfer case supported by the gear case in the power transmission device according to the first embodiment.

FIG. 4 shows the transfer case 7 supported by the gear case 4 in the power transmission device according to the first embodiment. FIG. 5 shows the detailed configuration of the transfer case 7. The detailed configuration of the transfer case 7 will be described below with reference to FIGS. 2, 4, and 5.

As shown in FIG. 4, the transfer case 7 is supported at a position on the vehicle-rearward lower side of the gear case 4 in a state in which the transfer output shaft 74 projects toward the rearward side of the vehicle, when the gear case 4 is viewed from the right side. As shown in FIG. 4, a parking actuator 38 is disposed at the uppermost position of the gear case 4.

As shown in FIGS. 2 and 5, the transfer case 7 includes the transfer input shaft 71, a transfer intermediate shaft 72, the transfer output shaft 74, a bevel gear pair 75, and a transfer gear pair 76 (the power transmission element) provided in a transfer casing 77.

As shown in FIG. 3, the transfer input shaft 71 is a hollow shaft that is connected to the differential case 5a of the front differential 5 and that is disposed in a position above the axis of rotation 45 of the front differential 5. The transfer input shaft 71 is oil-sealed with respect to the transfer casing 77 and supported at both ends. An input shaft gear 75a that meshes with an idler shaft gear 75b is integrally provided at an outer circumferential position of the transfer input shaft 71.

As shown in FIG. 5, the transfer idler shaft 72 is disposed at a position between the transfer input shaft 71 and the transfer parallel shaft 73, parallel to the two shafts 71, 73. The transfer idler shaft 72 is provided in a state of being supported at both ends with respect to the transfer casing 77. The idler shaft gear 75b that meshes with the input shaft gear 75a and a parallel shaft gear 75c is integrally provided at an outer circumferential position of the transfer idler shaft 72. As seen from the side, the transfer idler shaft 72 is disposed lower and more rearward in the vehicle than the transfer input shaft 71, and at a radially outer side position of the front differential 5, as shown in FIG. 4.

As shown in FIG. 5, the transfer parallel shaft 73 is disposed rearward of the transfer idler shaft 72, parallel to the transfer input shaft 71 and the transfer idler shaft 72. The transfer parallel shaft 73 is provided in a state of being supported at both ends with respect to the transfer casing 77. The parallel shaft gear 75c, which meshes with the idler shaft gear 75b, is integrally provided at an outer circumferential position of the transfer parallel shaft 73, on a side away from the gear case 4. In addition, a ring gear 76a, which meshes with a pinion gear 76b, is provided on a side close to the gear case 4, such that the fixed position thereof in the axial direction can be adjusted. As seen from the side, the transfer parallel shaft 73 is disposed higher and more rearward in the vehicle than the transfer idler shaft 72, and at a radially outer side position of the front differential 5, as shown in FIG. 4. Additionally, as seen from the side, the transfer parallel shaft 73 is disposed in a position higher than the transfer idler shaft 72, and at a position that is slightly higher than the transfer input shaft 71, as shown in FIG. 4.

The transfer output shaft 74 is oriented toward the rear side of the vehicle, essentially perpendicular to the transfer parallel shaft 73, which is arranged in the vehicle width direction, and the front-end portion thereof is disposed at a position near the transfer parallel shaft 73. The transfer output shaft 74 is provided in a state of being supported at both ends with respect to the transfer casing 77. The pinion gear 76b that meshes with the ring gear 76a is provided at a front-end portion of the transfer output shaft 74. A flange portion 74a, to which the first rear propeller shaft 21 is connected, is integrally provided at a rear end portion of the transfer output shaft 74. As seen from the side, the transfer output shaft 74 is arranged having a downward gradient angle that becomes gradually lower toward the rear side of the vehicle, as shown in FIG. 4.

The transfer gear train 75 is a power transmission mechanism that connects the transfer input shaft 71, the transfer idler shaft 72, and the transfer parallel shaft 73, which are arranged parallel to each other, so as to be capable of transmitting power by means of gear engagement. This transfer gear train 75 is composed of the input shaft gear 75a of the transfer input shaft 71, the idler shaft gear 75b of the transfer idler shaft 72, and the parallel shaft gear 75c of the transfer parallel shaft 73, which engage with each other.

The bevel gear pair 76 is a power transmission mechanism that connects the transfer parallel shaft 73 and the transfer output shaft 74, which are arranged orthogonally to each other, so as to be capable of transmitting power by means of gear engagement. The bevel gear pair 76 is composed of the pinion gear 76b and the ring gear 76a having a high void gear structure, which orthogonally engage with each other. The ring gear 76a of the bevel gear pair 76 is provided on the transfer parallel shaft 73. The position at which the ring gear 76a is set on the transfer parallel shaft 73 is configured to be adjustable on the vehicle width direction axis along the transfer parallel shaft 73.

The pinion gear 76b of the bevel gear pair 76 is provided on an end portion of the transfer output shaft 74. Then, the pinion gear 76b is disposed at a position that overlaps with the gear case 4 in the vehicle width direction.

Here, as shown in FIG. 5, the line produced by extending the right side surface 4a of the gear case 4 in the longitudinal direction of the vehicle is defined as extension line L1, and the line produced by extending the gear case-side outer peripheral end of the pinion gear 76b in the longitudinal direction of the vehicle is defined as extension line L2. The pinion gear 76b provides a margin of overlap OL that overlaps the gear case 4 between the extension line L1 and the extension line L2 in the vehicle width direction.

Next, the operations are described. "The operation of arranging the floor tunnel of rear propeller shaft," "the operation of adjusting the margin of overlap," and "the operation of adjusting the longitudinal/vertical position of the transfer output shaft" will be described separately regarding the operations of the first embodiment.

Operation of Arranging the Floor Tunnel of the Rear Propeller Shaft

Figure 6:
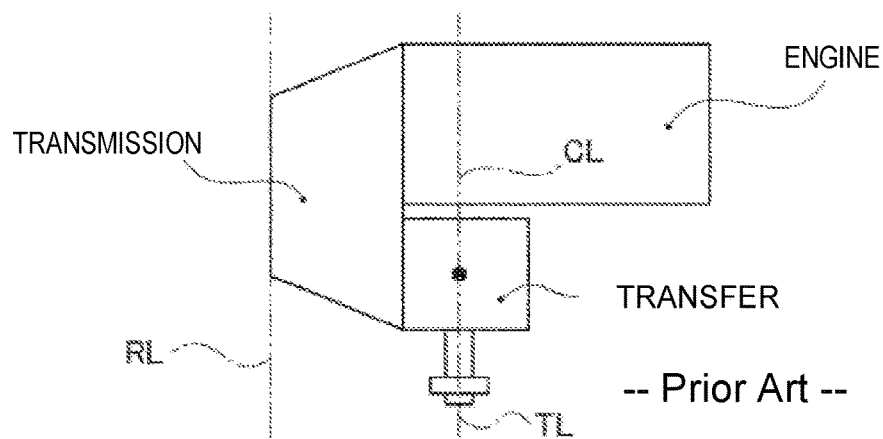
FIG. 6 is a layout configuration diagram that shows a vehicle mounting layout of an engine, a transmission, and a transfer case in a conventional four-wheel drive engine-powered vehicle.
Figure 7:
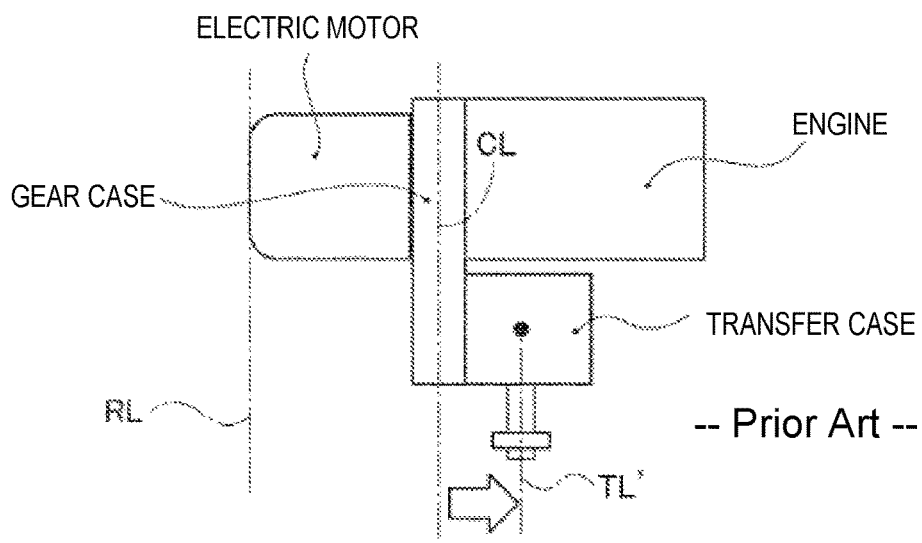
FIG. 7 is a layout configuration diagram that shows a vehicle mounting layout of an engine, an electric motor, a gear case, and a transfer case in a four-wheel drive hybrid vehicle in a comparative example.
Figure 8:
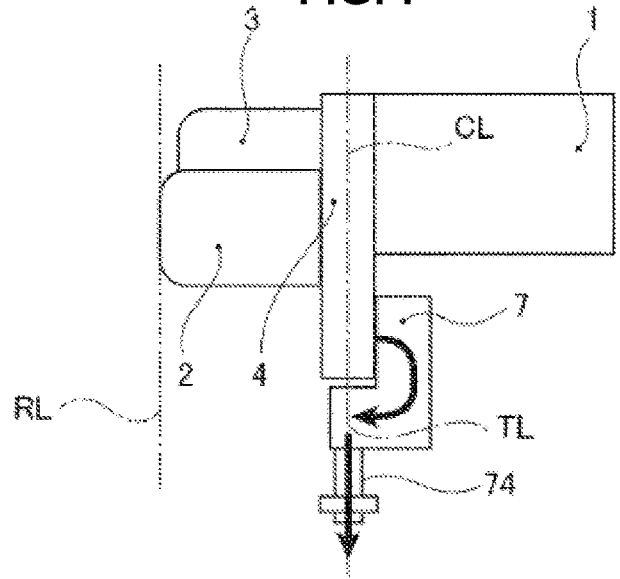
FIG. 8 is a layout configuration diagram that shows a vehicle mounting layout of a transverse engine, a motor, a generator, a gear case, and a transfer case in a four-wheel drive electrically driven vehicle according to the first embodiment.

FIG. 6 shows a vehicle mounting layout of an engine, a transmission, and a transfer case in a conventional four-wheel drive engine-powered vehicle, and FIG. 7 shows a vehicle mounting layout of an engine, an electric motor, a gear case, and a transfer case in a four-wheel drive hybrid vehicle in a comparative example. FIG. 8 shows a vehicle mounting layout of the transverse engine 1, the motor 2, the generator 3, the gear case 4, and the transfer case 7 in the four-wheel drive electrically driven vehicle according to the first embodiment. The operation of arranging the floor tunnel of the rear propeller shaft will be described below with reference to FIGS. 6 to 8.

In the conventional example, the transfer case is located on the same side surface of the two side surfaces of the transmission housing that supports the engine, as shown in FIG. 6. With this layout arrangement, the location TL of the transfer output shaft of the transfer case is arranged essentially coinciding with the center location CL of the engine and the transmission case in the vehicle width direction. Therefore, it is possible to dispose the propeller shaft, which is connected to the transfer output shaft, in the floor tunnel.

However, with advancements in the electrification of vehicles in recent years, it is now conceivable to add an electric motor as an additional power source to the engine. Therefore, as shown in FIG. 7, an example in which the electric motor is located on the side surface of the two side surfaces of the gear case that is opposite to the side surface on which the engine is supported, and the transfer case is located on the same side surface on which the engine is supported, as in the conventional example, shall serve as a comparative example.

In the case of the comparative example, the location TL' of the transfer output shaft shifts from the center location CL of the engine, the gear case, and the electric motor in the vehicle width direction toward the engine side in the vehicle width direction, as indicated by the arrow in FIG. 7. The reason for this is that the layout arrangement of the power unit with respect to the front power unit room is such that the end surface position of the transmission in the conventional example is used as a reference location RL, and the location of the end surface of the electric motor is also made to coincide with the reference location RL in the comparative example. Therefore, in the case of the conventional example, the engine and the transmission are arranged along the vehicle width direction, and the center location CL in the vehicle width direction overlaps the engine. In contrast, in the case of the comparative example, with the engine, the gear case, and the electric motor arranged in the vehicle width direction, the combined dimensions of the gear case and the electric motor in the vehicle width direction now exceed the transmission dimension in the vehicle width direction, so that the center location CL in the vehicle width direction overlaps the gear case.

As a result, in the case of the comparative example, in which the transfer case has the same layout configuration as in the conventional example, the following problems occur.

(a') The location TL' of the transfer output shaft is shifted from the center location CL in the vehicle width direction, and the propeller shaft cannot be disposed in the floor tunnel.

(b') In the case of the power train with electric motor of the comparative example, it becomes necessary to make additional investments in the development of a dedicated platform for mounting the power train with electric motor.

(c') When the power train with electric motor of the comparative example is to be mounted in a conventional vehicle body structure, the development of a new structure, such as a dedicated engine or a dedicated gear case, is required.

In contrast, the first embodiment employs a configuration in which the pinion gear 76b provided at the end portion of the transfer output shaft 74 is disposed at a position that overlaps the gear case 4 in the vehicle width direction, as shown in FIG. 8.

That is, in the case of the first embodiment, since the transverse engine 1, the gear case 4, and the motor 2 are arranged in the vehicle width direction and the combined dimensions of the gear case 4 and the motor 2 in the vehicle width direction exceed the transmission dimension in the vehicle width direction, center location CL in the vehicle width direction overlaps the gear case 4. However, by arranging the pinion gear 76b provided at the end portion of the transfer output shaft 74 in a position overlapping the gear case 4 in the vehicle width direction, the location TL of the transfer output shaft 74 will overlap the gear case 4. That is, the transfer case 7 is configured to wrap around such that the transfer output shaft 74 overlaps the gear case 4. As a result, it becomes possible to make the center location CL and the location TL of the transfer output shaft 74 in the vehicle width direction coincide, in the same manner as in the conventional example, while employing a layout configuration in which the transverse engine 1, the gear case 4, and the motor 2 are arranged along the vehicle width direction, in the same manner as in the comparative example.

As a result, with a layout configuration in which the transfer output shaft 74 of the first embodiment overlaps the gear case 4 in the vehicle width direction, the following advantages can be obtained.

(a) By making the location TL of the transfer output shaft 74 and center location CL in the vehicle width direction coincide, the first rear propeller shaft 21 can be disposed in the floor tunnel 37 of the vehicle body structure of a conventional four-wheel drive engine-powered vehicle.

(b) In the case of the first embodiment, because it is possible to share the platform with the conventional four-wheel drive engine-powered vehicle, it is not necessary to make additional investments in the development of a dedicated platform for a power train with electric motor.

(c) In the case of the first embodiment, since mounting in the vehicle body structure of a conventional four-wheel drive engine-powered vehicle is possible, the development of a new structure, such as a dedicated engine or gear case, is not required.

Operation of Adjusting the Margin of Overlap

Figure 9:
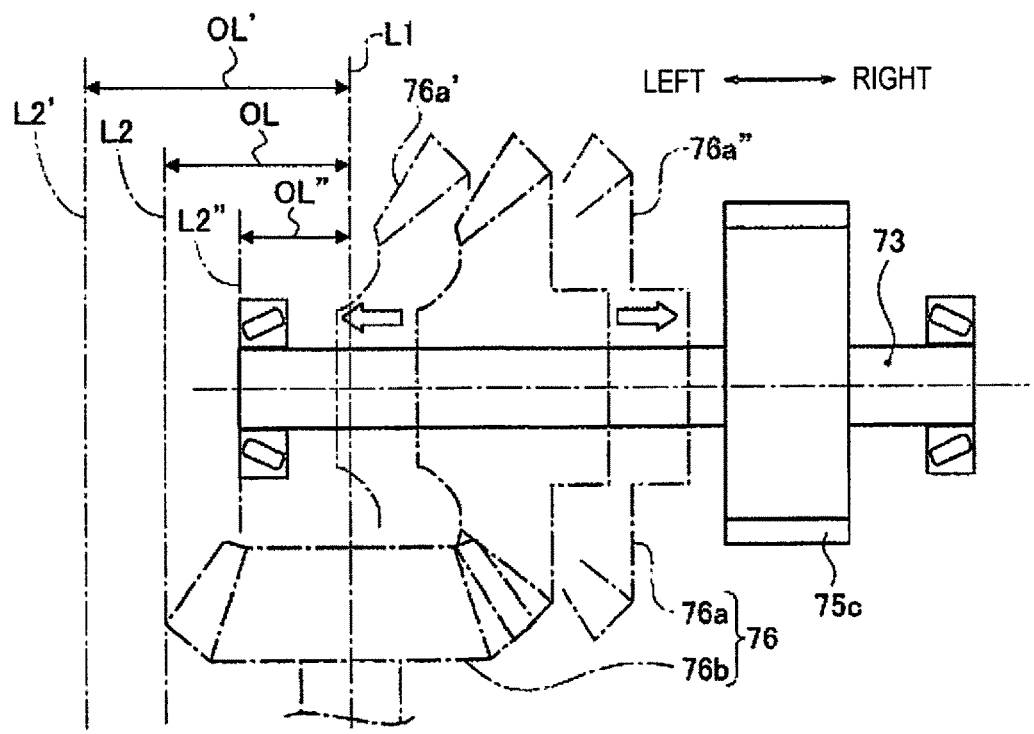
FIG. 9 is a functional explanatory view that shows the operation of adjusting the lateral position of a transfer output shaft by means of a ring gear provided on a transfer parallel shaft in the transfer case according to the first embodiment.

FIG. 9 shows the operation of adjusting the lateral position of the transfer output shaft 74 by means of the ring gear 76a provided on the transfer parallel shaft 73 in the transfer case 7 according to the first embodiment. The operation of adjusting the margin of overlap OL will be described below with reference to FIG. 10.

In the first embodiment, the ring gear 76a of the bevel gear pair 76 is provided on the transfer parallel shaft 73, and the position at which the ring gear 76a is set on the transfer parallel shaft 73 is configured to be adjustable over the vehicle width direction axis along the transfer parallel shaft 73.

Therefore, if the position at which the ring gear 76a is set on the transfer parallel shaft 73 is moved toward the left in FIG. 9 and set at the position of the ring gear 76a', the extension line L2 moves to the position of the extension line L2'. Thus, the margin of overlap OL (L1-L2) in which the ring gear 76b overlaps the gear case 4 in the vehicle width direction becomes the margin of overlap OL' (L1-L2'), so that the margin of overlap is increased.

On the other hand, if the position at which the ring gear 76a is set on the transfer parallel shaft 73 is moved toward the right in FIG. 9 and set at the position of the ring gear 76e, the extension line L2 moves to the position of the extension line L2". Thus, the margin of overlap OL (L1-L2) in which the ring gear 76b overlaps the gear case 4 in the vehicle width direction becomes the margin of overlap OL" (L1-L2"), so that the margin of overlap is decreased.

In this manner, by moving the position at which the ring gear 76a is set on the transfer parallel shaft 73 within the allowable margin range, it is possible to adjust the size of the margin of overlap OL in which the ring gear 76b overlaps the gear case 4 in the vehicle width direction.

As a result, during assembly on a vehicle body structure of a conventional four-wheel drive engine-powered vehicle, it is possible to set the transfer output shaft 74 and the first rear propeller shaft 21 at locations that avoid interference with peripheral components by means of the transfer output shaft 74 lateral position adjustment function. In particular, it is possible to reliably set the first rear propeller shaft 21, which is connected to the transfer output shaft 74, to coincide with the existing vehicle-widthwise location of the floor tunnel 37 by means of the margin of overlap OL adjustment function.

Figure 10:
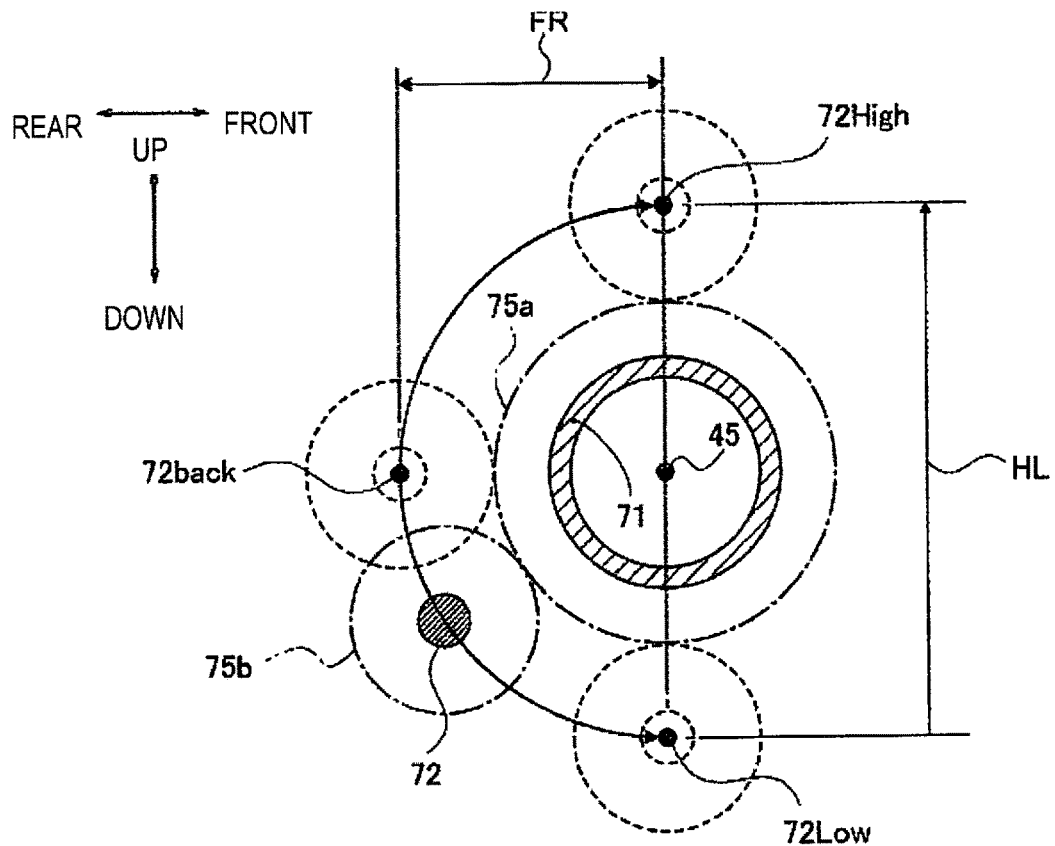
FIG. 10 is a functional explanatory view that shows the operation of adjusting the longitudinal/vertical position of the transfer output shaft by means of additional setting of a transfer idler shaft in the transfer case according to the first embodiment.

Operation of Adjusting the Longitudinal/Vertical Position of Transfer Output Shaft FIG. 10 shows the operation of adjusting the longitudinal/vertical position of the transfer output shaft 74 by means of an additional setting of the transfer idler shaft 72 in the transfer case 7 according to the first embodiment. The operation of adjusting the longitudinal/vertical position of the transfer output shaft 74 will be described below with reference to FIG. 10.

In the first embodiment, the transfer idler shaft 72 is additionally set between the transfer input shaft 71 and the transfer parallel shaft 73, and the idler shaft gear 75b of the transfer idler shaft 72 is engaged with the input shaft gear 75a.

For this reason, in the transfer idler shaft 72, it is possible to change the location of the axis of the transfer idler shaft 72 by changing the engagement position of the idler shaft gear 75b relative to the input shaft gear 75a along the semicircular arrow shown in FIG. 10, the center of which coincides with the axis of rotation 45 of the front differential 5. As a result of this change in the location of the axis, the highest position of the transfer idler shaft 72 in the vertical direction becomes the transfer idler shaft 72High, and the lowest position of the transfer idler shaft 72 in the vertical direction becomes the transfer idler shaft 72Low. Therefore, it is possible to obtain a vertical adjustment margin HL between transfer idler shaft 72High and transfer idler shaft 72Low as the vertical adjustment margin of the transfer idler shaft 72. This vertical adjustment margin HL of the transfer idler shaft 72 can be reflected in the vertical adjustment of the transfer output shaft 74 that is connected by means of gear engagement.

On the other hand, the rearmost position of the transfer idler shaft 72 in the longitudinal direction becomes transfer idler shaft 72Back by changing the axis position of the transfer idler shaft 72. Therefore, it is possible to obtain a longitudinal adjustment margin FR between transfer idler shaft 72Back and transfer idler shaft 72High, 72Low as the longitudinal adjustment margin of the transfer idler shaft 72. This longitudinal adjustment margin FR of the transfer idler shaft 72 can be reflected in the longitudinal adjustment of the transfer output shaft 74 that is connected by means of gear engagement.

As a result, during assembly on a vehicle body structure of a conventional four-wheel drive engine-powered vehicle, it is possible to set the transfer output shaft 74 and the first rear propeller shaft 21 at positions that avoid interference with peripheral components by means of the transfer output shaft 74 vertical/longitudinal position adjustment function.

Next, the effects are described. The following effects can be obtained with the power transmission device of the four-wheel drive electrically driven vehicle according to the first embodiment.

(1) Supported by the gear case 4, the transfer case 7A distributes power from a power source (the transverse engine 1, the motor 2) between the main drive wheels (the left and right front wheels 6L, 6R) and auxiliary drive wheels (the left and right rear wheels 10L, 10R). The power transmission device of a four-wheel drive vehicle (a four-wheel drive electrically driven vehicle) comprises an engine (the transverse engine 1) that is supported on one side surface (the right side surface 4a) of the two side surfaces 4a, 4b of the gear case 4, and an electric motor (the motor 2) that is supported on the other side surface (the left side surface 4b) of the two side surfaces 4a, 4b of the gear case 4. The transfer case 7 wraps around from the side surface (the right side surface 4a) to the rear surface 4c of the gear case 4, as seen from above, and outputs power to the auxiliary drive wheels (the left and right rear wheels 10L, 10R) from the rear surface 4c side of the gear case 4. Therefore, it is possible to locate the transfer output shaft 74 at essentially the center position in the vehicle width direction and to avoid the inability to locate the propeller shaft (the first rear propeller shaft 21) in the floor tunnel 37. In addition, the present invention can be applied to a power unit layout arrangement of a four-wheel drive hybrid vehicle on which the engine (the transverse engine 1) and the electric motor (the motor 2) are mounted with the gear case 4 interposed therebetween.

(2) The electric motor is the motor 2 and the generator 3. The gear case 4 has the speed-increasing gear mechanism 41 that connects the engine (the transverse engine 1) and the generator 3, and the reduction gear mechanism 42 that connects the motor 2 and a differential (the front differential 5) (FIG. 2). Therefore, in addition to effect (1), with respect to four-wheel drive hybrid vehicles, the present invention can be applied to a power unit layout arrangement of a four-wheel drive electrically driven vehicle powered by the motor 2, using the electric power generated by the engine (the transverse engine 1).

(3) The transfer case 7 has the transfer input shaft 71, the transfer output shaft 74, and a power transmission mechanism (the transfer gear train 75, the bevel gear pair 76). The transfer input shaft 71 is connected to the differential (the front differential 5) to the main drive wheels (the left and right front wheels 6L, 6R) and is arranged in the vehicle width direction. The transfer output shaft 74 is connected to the propeller shaft (the first rear propeller shaft 21) to the auxiliary drive wheels (the left and right rear wheels 10L, 10R) and is arranged in the longitudinal direction of the vehicle. The power transmission mechanism (the transfer gear train 75, the bevel gear pair 76) transmits power by changing the direction of the axis of rotation to an essentially orthogonal direction between the transfer input shaft 71 and the transfer output shaft 74 and transmits the power. The rotatable member (the pinion gear 76b) of the power transmission mechanism (the transfer gear train 75, the bevel gear pair 76), which rotatable member is provided on the transfer output shaft 74 is disposed at a position that overlaps the gear case 4 in the vehicle width direction (FIG. 5). As a result, in addition to effect (1) or (2), it is possible to configure the transfer case 7 to wrap around to the rear surface 4c of the gear case 4 by means of an overlapping arrangement of the rotatable member (the pinion gear 76b) provided on the transfer output shaft 74.

(4) The transfer case 7 wraps around from the same side surface (the right side surface 4a) of the two side surfaces 4a, 4b of the gear case 4 as the side surface on which the engine (the transverse engine 1) is supported, to the rear surface 4c, as seen from above, and outputs power to the auxiliary drive wheels (the left and right rear wheels 10L, 10R) from the rear surface 4c side of the gear case 4 (FIG. 5). As a result, in addition to effects (1) to (3), it is possible to achieve a power unit layout arrangement of a four-wheel drive vehicle (a four-wheel drive electrically driven vehicle) that is compatible with both right-hand drive cars and left-hand drive cars. That is, in the case of a right-hand drive car, a right-side space RS in FIG. 2 becomes the space in which right steering system components are disposed. In the case of a left-hand drive car, a left-side space LS in FIG. 2 becomes the space in which left steering system components are disposed.

Second Embodiment

The second embodiment is an example in which the transfer case wraps around from the side surface of the two side surfaces of the gear case which is opposite the side surface on which the engine is supported, to the rear surface of the gear case, as seen from above, and outputs power to the auxiliary drive wheels from the rear surface side of the gear case.

The configuration is described first. The "overall system configuration" and the "detailed configuration of the gear case" are the same configurations as the first embodiment, except that the side surface of the gear case on which the transfer case is supported is opposite to that of the first embodiment, so that illustrations and descriptions thereof are omitted. The "layout configuration of front-side power transmission system" and the "detailed configuration of transfer case" of the second embodiment will be described below.

Layout Configuration of the Front-Side Power Transmission System

Figure 11:
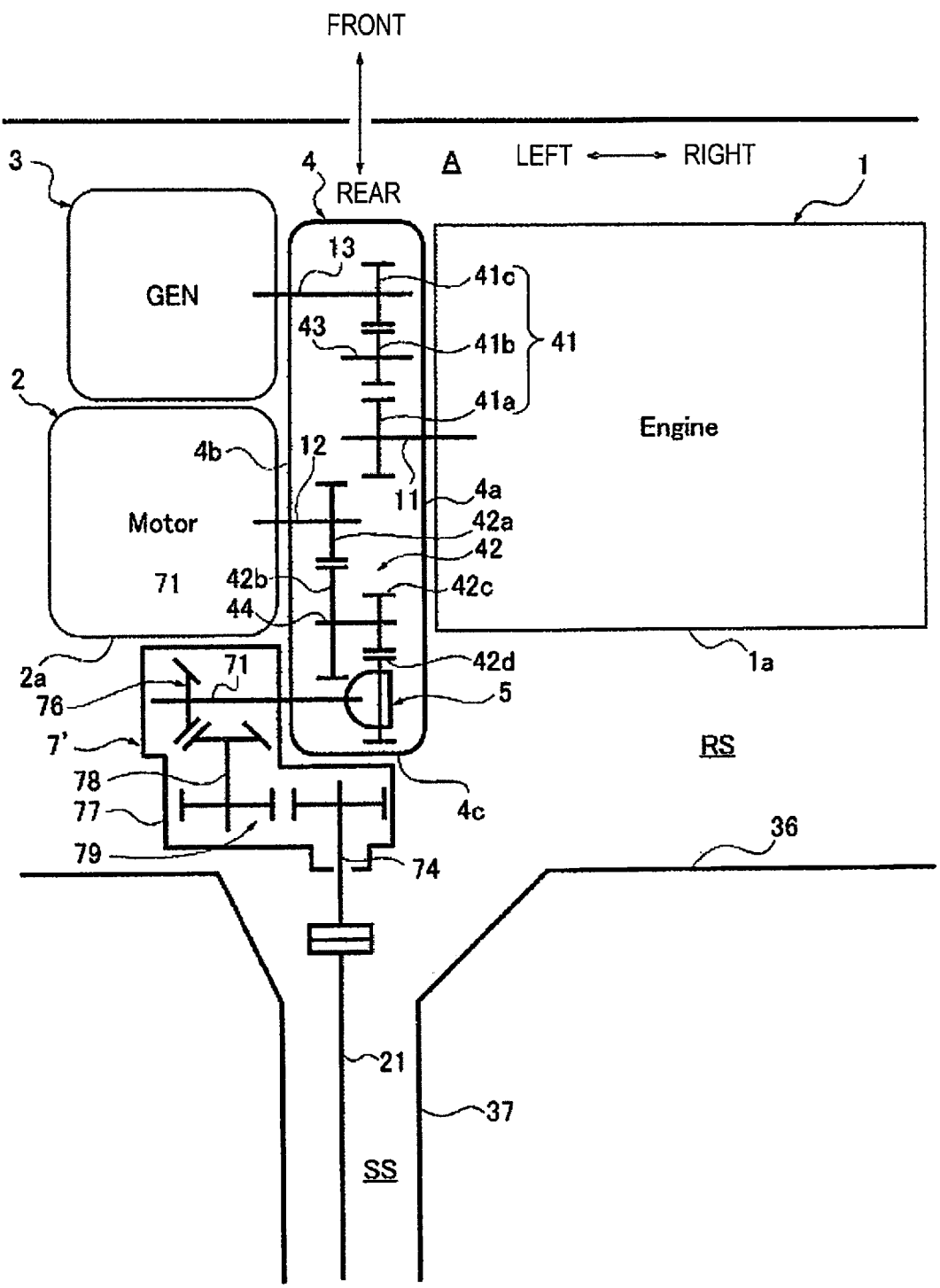
FIG. 11 is a skeleton diagram that shows a layout configuration of a front-side power transmission system in a second embodiment.

FIG. 11 shows a layout configuration of a front-side power transmission system in the second embodiment. The layout configuration of the front-side power transmission system will be described below with reference to FIG. 11.

As shown in FIG. 11, the transverse engine 1, the motor 2, the generator 3, the gear case 4, the front differential 5, and a transfer case 7' are arranged in a front power unit room A as the front-side power transmission system.

The transverse engine 1 is supported on the right side surface 4a of the two side surfaces 4a, 4b of the gear case 4, and is arranged horizontally such that the engine crankshaft 11 is oriented in the vehicle width direction, in a right side space region of the front power unit room A.

The motor 2 is supported on the left side surface 4b of the two side surfaces 4a, 4b of the gear case 4, and is arranged horizontally such that the motor shaft 12 is oriented in the vehicle width direction, in a left side space region of the front power unit room A. The motor 2 is smaller than the transverse engine 1 in the vehicle width direction (the vehicle width direction dimension of the engine>the vehicle width direction dimension of the motor).

The generator 3 is supported on the left side surface 4b of the two side surfaces 4a, 4b of the gear case 4 at an adjacent position in front of and below the motor 2 with respect to the vehicle, and is arranged horizontally such that the generator shaft 13 is oriented in the vehicle width direction in the left side space region of the front power unit room A. This generator 3 is even smaller than the motor 2 (the vehicle width direction dimension of the motor>the vehicle width direction dimension of the generator).

The gear case 4 is arranged in a central space region of the front power unit room A, interposed between the transverse engine 1 on side surfaces 4a, and the motor 2 and generator 3 on side surface 4b. As shown in FIG. 11, the gear case 4, in a plan view, has the form of a rectangle with the short side in the width direction of the vehicle and the long side in the longitudinal direction of the vehicle. The vehicle rearward portion of the gear case 4, which includes the front differential 5, projects farther toward the rear of the vehicle than the vehicle rearward end surfaces 1a, 2a of the transverse engine 1 and the motor 2, respectively. The portions of the gear case 4 that project toward the rearward side of the vehicle, i.e., the right side surface 4a, and the left side surface 4b and a rear surface 4c (the vehicle rearward side surface) in which the transfer case 7' is disposed, form an exposed portion.

In a top view, the transfer case 7' is supported by the gear case 4 by wrapping around the left side surface 4b of the two side surfaces 4a, 4b of the gear case on which the motor 2 and the generator 3 are supported, from the left side surface 4b to the rear surface 4c of the exposed portion of the gear case 4. The transfer output shaft 74 then outputs power from the rear surface 4c of the gear case 4 to the left and right rear wheels 10L, 10R via the first propeller shaft 21 in the longitudinal direction of the vehicle.

In this manner, since a layout configuration of the front-side power transmission system is employed in which the transfer case 7' is supported by the gear case 4 by wrapping around from the left side surface 4b to the rear surface 4c, as seen from above, the following spaces are provided.

(A) A right-side space RS, surrounded by a vehicle-rear end surface 1a of the transverse engine 1, a dash panel 36, and a right-side vehicle body panel, not shown, is provided.

(B) A shaft space SS, in which the first propeller shaft 21 is disposed, is provided in a floor tunnel 37 extending in the longitudinal direction of the vehicle at essentially the central area in the vehicle width direction.

Detailed Configuration of the Transfer Case

Figure 12:
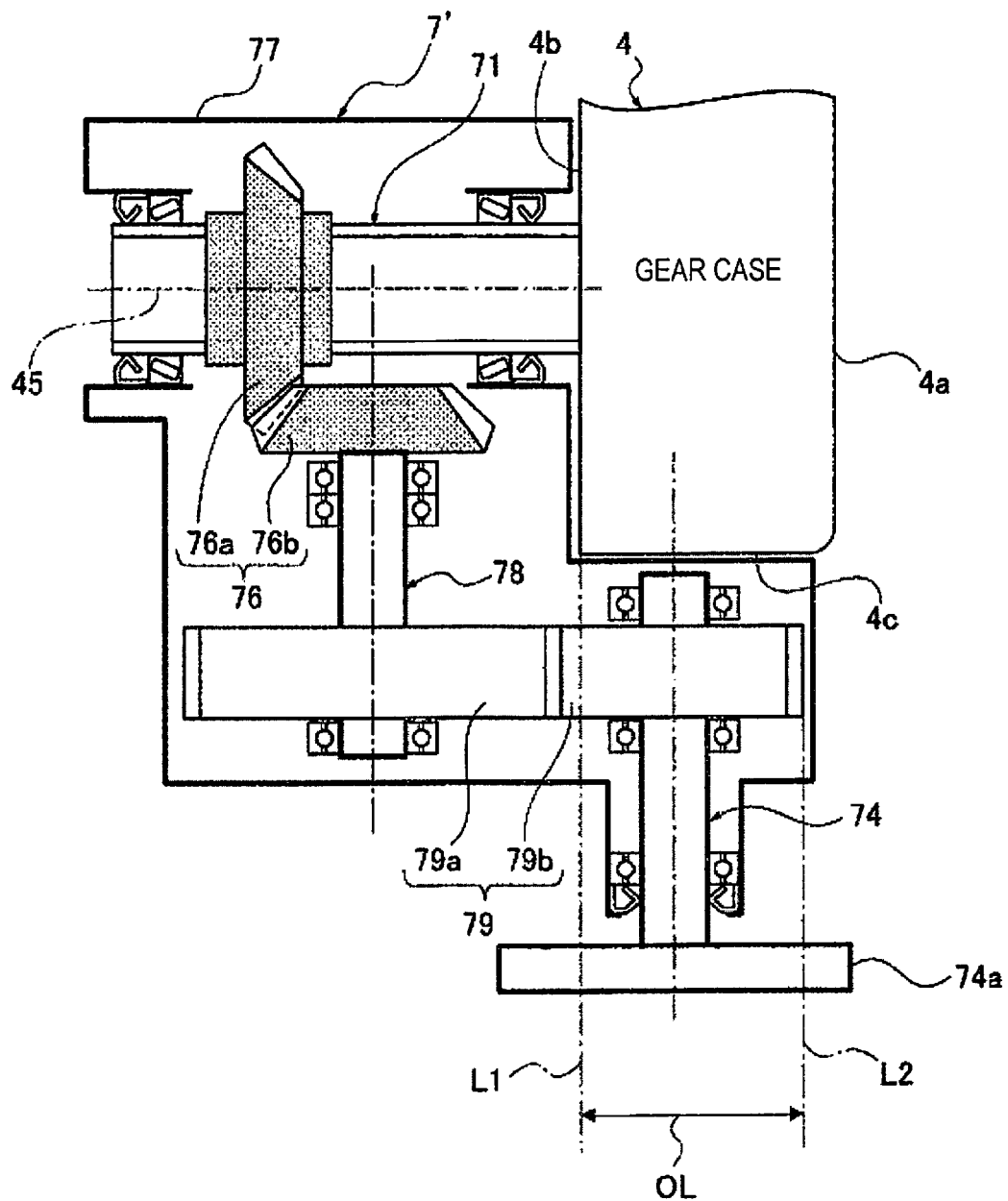
FIG. 12 is a cross-sectional view of the transfer case that shows a detailed configuration of the transfer case supported by the gear case in the power transmission device according to the second embodiment.

FIG. 12 shows the detailed configuration of the transfer case 7' according to the second embodiment. The detailed configuration of the transfer case 7' will be described below with reference to FIG. 12.

As shown in FIG. 12, in the transfer case 7', the transfer input shaft 71, a transfer intermediate shaft 78, the transfer output shaft 74, the bevel gear pair 76 (the power transmission mechanism), and the transfer gear pair 79 (the power transmission element) are provided in the transfer casing 77.

Here, the bevel gear pair 76 and the transfer gear pair 79 are configured as the power transmission mechanism transmits power by changing the direction of the axis of rotation to an essentially orthogonal direction between the transfer input shaft 71 and the transfer output shaft 74.

As shown in FIG. 12, the transfer input shaft 71 is a hollow shaft that is connected to the differential case 5a of the front differential 5 and that is disposed at a position above the axis of rotation 45 of the front differential 5. The transfer input shaft 71 is oil-sealed with respect to the transfer casing 77 and supported at both ends. The ring gear 76a that meshes with the pinion gear 76b is integrally provided at an outer circumferential position of the transfer input shaft 71.

As shown in FIG. 12, the transfer intermediate shaft 78 is oriented toward the rear side of the vehicle, essentially perpendicular to the transfer input shaft 71, which is arranged in the vehicle width direction, and the front end portion thereof is disposed at a position near the transfer input shaft 71. This transfer intermediate shaft 78 is supported at both ends with respect to the transfer casing 77. The pinion gear 76b that meshes with the ring gear 76a is provided at the front-end portion of the transfer intermediate shaft 78. An intermediate shaft gear 79a is integrally provided at the rear portion of the transfer intermediate shaft 78.

The transfer output shaft 74 is arranged parallel to the transfer intermediate shaft 78 arranged in the longitudinal direction of the vehicle. This transfer output shaft 74 is supported at both ends with respect to the transfer casing 77. An output shaft gear 79b that meshes with an intermediate shaft gear 79a is provided at a front portion of the transfer output shaft 74. A flange portion 74a, to which the first rear propeller shaft 21 is connected, is integrally provided at a rear end portion of the transfer output shaft 74.

The bevel gear pair 76 is a power transmission mechanism that connects the transfer input shaft 71 and the transfer intermediate shaft 78, which are arranged orthogonally to each other, so as to be capable of transmitting power by means of gear engagement. The bevel gear pair 76 is composed of the pinion gear 76b and the ring gear 76a, which has a high void gear structure, and orthogonally engage with each. The ring gear 76a of the bevel gear pair 76 is provided on the transfer input shaft 71. The position at which the ring gear 76a is set on the transfer input shaft 71 is configured to be adjustable over vehicle width direction axis along the transfer input shaft 71.

The transfer gear pair 79 is a power transmission mechanism that connects the transfer intermediate shaft 78 and the transfer output shaft 74, which are arranged parallel to each other, so as to be capable of transmitting power by means of gear engagement. This transfer gear pair 79 is composed of the intermediate shaft gear 79a of the transfer intermediate shaft 78 and the output shaft gear 79b of the transfer output shaft 74, which engage with each other.

The output shaft gear 79*b* (the rotated member provided on the transfer output shaft) of the transfer gear pair 79 is disposed at a position that overlaps with the gear case 4 in the vehicle width direction.

Here, as shown in FIG. 12, a line obtained by extending the left side surface 4*b* of the gear case 4 in the longitudinal direction of the vehicle is defined as extension line L1, and a line obtained by extending an engine-side outer peripheral end of the output shaft gear 79*b* in the longitudinal direction of the vehicle is defined as extension line L2. At this time, the output shaft gear 79*b* provides a margin of overlap OL that overlaps with the gear case 4 in the vehicle width direction, between the extension line L1 and the extension line L2.

Regarding the margin of overlap OL, the position at which the ring gear 76*a* is set on the transfer input shaft 71 is configured to be adjustable over vehicle width direction axis along the transfer input shaft 71. Moreover, the transfer intermediate shaft 78 and the transfer output shaft 74 are coupled so as to be capable of transmitting power by means of gear engagement. Therefore, it is possible to adjust the size of the margin of overlap OL by moving the ring gear 76*a* within an allowable margin range and/or changing the gear diameters of the intermediate shaft gear 79*a* and the output shaft gear 79*b*.

Figure 13:
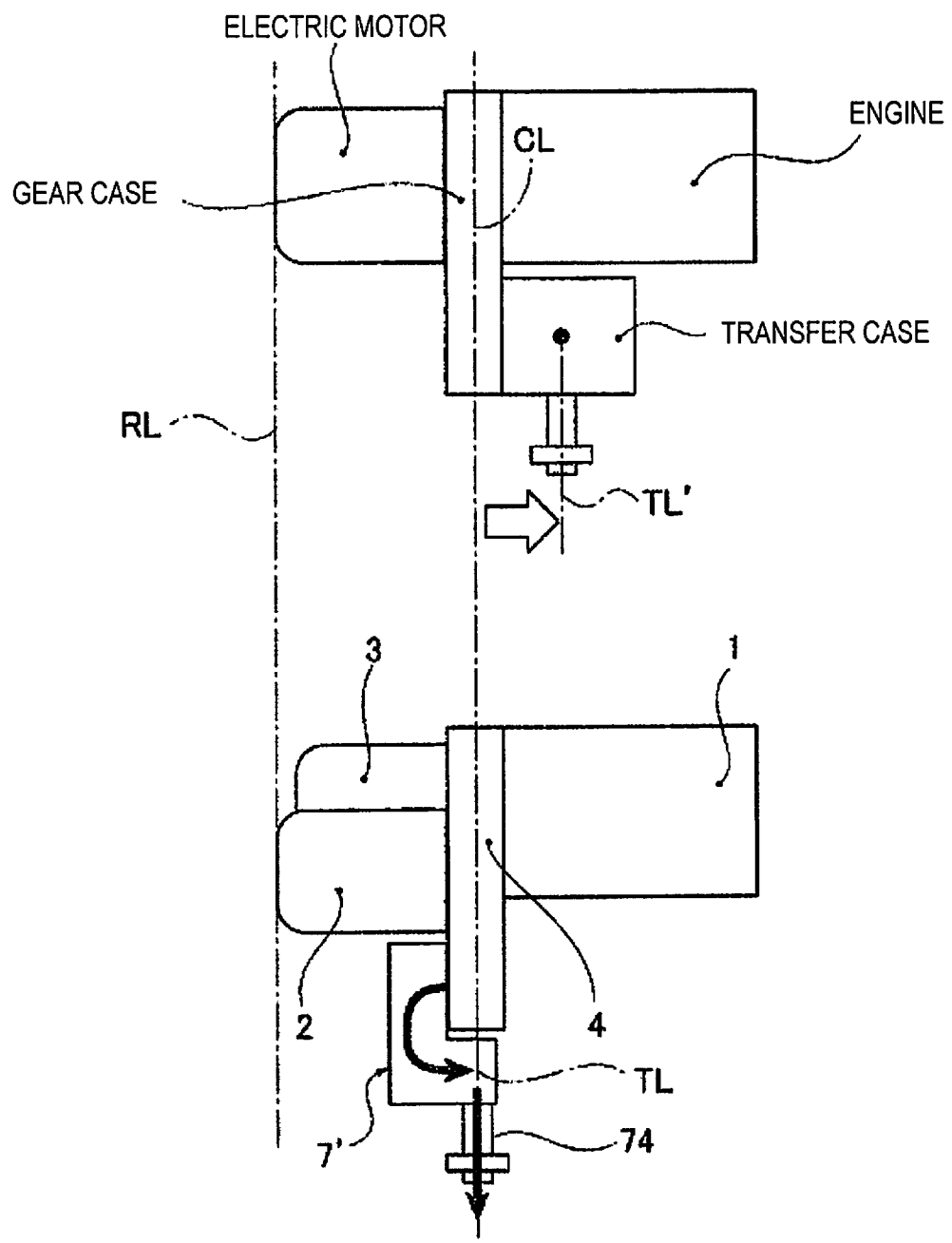
FIG. 13 is a comparative layout configuration diagram that shows a comparison between a vehicle mounting layout of a four-wheel drive hybrid vehicle of a comparative example and a vehicle mounting layout of a four-wheel drive electrically driven vehicle according to the second embodiment.

Next, the actions are described. FIG. 13 shows a comparison between a vehicle mounting layout of a four-wheel drive hybrid vehicle of a comparative example and a vehicle mounting layout of a four-wheel drive electrically driven vehicle according to the second embodiment. The operation of arranging the floor tunnel of the rear propeller shaft will be described below with reference to FIG. 13.

In the case of this comparative example, the location TL' of the transfer output shaft shifts toward the engine side in the vehicle width direction from the vehicle-widthwise center position CL of the engine, the gear case, and the electric motor, as indicated by the arrow in FIG. 13.

In contrast, the second embodiment employs a configuration in which the transfer case 7' is supported on the left side surface 4*b* of the gear case 4, and the output shaft gear 76*b* provided at the end portion of the transfer output shaft 74 is disposed at a position that overlaps the gear case 4 in the vehicle width direction, as shown in FIG. 13.

That is, in the case of the first embodiment, since the transverse engine 1, the gear case 4, and the motor 2 are arranged in the vehicle width direction and the combined dimensions of the gear case 4 and the motor 2 in the vehicle width direction exceed the transmission dimension in the vehicle width direction, center location CL in the vehicle width direction overlaps the gear case 4. However, by arranging the output shaft gear 76*b* provided at the end portion of the transfer output shaft 74 in a position overlapping the gear case 4 in the vehicle width direction, the location TL of the transfer output shaft 74 will overlap the gear case 4. That is, the transfer case T is configured to wrap around such that the transfer output shaft 74 overlaps the gear case 4. As a result, it becomes possible to make the center location CL and the location TL of the transfer output shaft 74 in the vehicle width direction coincide, in the same manner as in the conventional example, while employing a layout configuration in which the transverse engine 1, the gear case 4, and the motor 2 are arranged along the vehicle width direction.

As a result, with a layout configuration in which the transfer output shaft 74 of the second embodiment overlaps the gear case 4 in the vehicle width direction, the following advantages can be obtained.

(a) By making the location TL of the transfer output shaft 74 and center location CL in the vehicle width direction coincide, the first rear propeller shaft 21 can be disposed in the floor tunnel 37 of the vehicle body structure of a conventional four-wheel drive engine-powered vehicle.

(b) In the case of the second embodiment, because it is possible to share the platform with the conventional four-wheel drive engine-powered vehicle, it is not necessary to make additional investments in the development of a dedicated platform for a power train with electric motor.

(c) In the case of the second embodiment, since mounting in the vehicle body structure of a conventional four-wheel drive engine-powered vehicle is possible, the development of a new structure, such as a dedicated engine or gear case, is not required.

Next, the effects are described. The following effects can be obtained with the power transmission device of the four-wheel drive electrically driven vehicle according to the second embodiment.

(5) The transfer case 7' wraps around from the same side surface (left side surface 4*b*) of the two side surfaces 4*a*, 4*b* of the gear case 4 as the side surface on which the electric motor (the motor 2) is supported, to the rear surface 4*c* as seen from above, and outputs power to the auxiliary drive wheels (the left and right rear wheels 10L, 10R) from the rear surface 4*c* side of the gear case 4 (FIG. 12). As a result, in addition to effects (1) to (3), it is possible to achieve a power unit layout arrangement of a four-wheel drive vehicle (a four-wheel drive electrically driven vehicle) in which a space for a steering configuration is provided for a right-hand drive car. That is, in the case of a right-hand drive car, a right-side space RS in FIG. 11, which is not subjected to spatial restrictions caused by the transfer case 7', becomes the space in which right steering system components are disposed. Therefore, for example, it is also possible to dispose right steering system components of a steer-by-wire structure having a reaction force motor, a clutch, and a steering actuator in the steering system.

The power transmission device of a four-wheel drive vehicle according to the present disclosure has been described above based on the first and second embodiments. However, specific configurations are not limited to these embodiments and various modifications and additions to the design can be made without departing from the scope of the invention according to each claim in the Claims.

In the first embodiment, an example was presented in which the transfer gear train 75 and the bevel gear pair 76 are used as the power transmission mechanism. In addition, in the second embodiment, an example was presented in which the bevel gear pair 76 and the transfer gear pair 79 are used as the power transmission mechanism. However, a transfer belt may be used as the power transmission mechanism instead of the transfer gear train and the transfer gear pair. Moreover, a combined belt-gear mechanism may be used.

In the first and second embodiments, examples were shown in which the gear case 4 has the speed-increasing gear mechanism 41 that connects the transverse engine 1 and the generator 3, and the reduction gear mechanism 42 that connects the motor 2 and the front differential 5. However, the gear case may be one in which a clutch mechanism that can connect the engine and the front differential, or the like, is added to the speed-increasing gear mechanism and the reduction gear mechanism. Moreover, the gear case may include a stepped transmission gear mechanism, a stepless transmission gear mechanism, or a power split gear mechanism.

In the first and second embodiments, examples were shown in which the power transmission device of the present disclosure is applied to an FF-based four-wheel drive electrically driven vehicle that has an engine as a power source for power generation and a motor as a power source for travel, and that uses the electrical power generated by the engine to drive the motor. However, the power transmission device of the present disclosure can also be applied to an FR-based four-wheel drive electrically driven vehicle. Moreover, the present disclosure can be applied not only to a four-wheel drive electrically driven vehicle, but also to a four-wheel drive engine-powered vehicle, a four-wheel drive electric vehicle, and a four-wheel drive hybrid vehicle.

The invention claimed is:

1. A power transmission device of a four-wheel drive vehicle, the power transmission device comprising:
a gear case; and
a transfer case that is supported by the gear case so that the transfer case overlaps a vehicle-widthwise center as viewed from above and that distributes power from a power source to main drive wheels and auxiliary drive wheels,
an engine being supported on one side surface of two side surfaces of the gear case so as the engine is offset from and does not overlap with the vehicle-widthwise center, and
an electric motor being supported on the other side surface of the two side surfaces of the gear case, the electric motor including a motor and a generator,
the transfer case wrapping around from one of the two side surfaces of the gear case to a rear surface of the gear case, as seen from above, and the transfer case being configured to output power to the auxiliary drive wheels from a rear side of the gear case, and
the gear case including a speed-increasing gear mechanism and a reduction gear mechanism, the speed-increasing gear mechanism connecting the engine and the generator and the reduction gear mechanism connecting the motor and a differential for the main drive wheels.

2. The power transmission device according to claim 1, wherein
the transfer case includes
a transfer input shaft that is connected to the differential and arranged in a vehicle width direction,
a transfer output shaft that is connected to the auxiliary drive wheels by a propeller shaft and arranged in a longitudinal direction of the vehicle, and
a power transmission mechanism that transmits power by changing a direction of an axis of rotation to an essentially orthogonal direction between the transfer input shaft and the transfer output shaft, and
a rotatable member of the power transmission mechanism, the rotatable member being provided on the transfer output shaft and disposed at a position overlapping the gear case in the vehicle width direction.

3. The power transmission device according to claim 1, wherein
the transfer case wraps around from the one side surface to the rear surface, as seen from above.

4. A power transmission device of a four-wheel drive vehicle, the power transmission device comprising:
a gear case; and
a transfer case that is supported by the gear case so that the transfer case overlaps a vehicle-widthwise center as viewed from above and that distributes power from a power source to main drive wheels and auxiliary drive wheels,
an engine being supported on one side surface of two side surfaces of the gear case so that the engine is offset from and does not overlap with the vehicle-widthwise center,
an electric motor being supported on the other side surface of the two side surfaces of the gear case, and
the transfer case wrapping around from the other side surface to a rear surface, as seen from above, and the transfer case being configured to output power to the auxiliary drive wheels from the rear surface side of the gear case.

5. A power transmission device of a four-wheel drive vehicle, the power transmission device comprising:
a gear case; and
a transfer case that is supported by the gear case so that the transfer case overlaps a vehicle-widthwise center as viewed from above and that distributes power from a power source to main drive wheels and auxiliary drive wheels,
an engine being supported on one side surface of two side surfaces of the gear case so as the engine is offset from and does not overlap with the vehicle-widthwise center, and
an electric motor being supported on the other side surface of the two side surfaces of the gear case, the electric motor includes a motor and a generator,
the transfer case wrapping around from one of the two side surfaces of the gear case to a rear surface of the gear case, as seen from above, and the transfer case being configured to output power to the auxiliary drive wheels from a rear side of the gear case,
the gear case having a rectangular shape that is longer in a vehicle longitudinal direction than in a vehicle width direction; and
the gear case including a differential that is connected to the main drive wheels, a speed-increasing gear mechanism that connects the engine and the generator, and a reduction gear mechanism that connects the motor and the differential.

6. The power transmission device according to claim 5, wherein
the transfer case is supported on the one side surface of the gear case on which the engine is supported,
the transfer case includes
a transfer input shaft that is connected to a differential case of the differential;
a transfer parallel shaft that is connected to the transfer input shaft via a power transmission element; and
a transfer output shaft that is connected to the transfer parallel shaft via a bevel gear pair and that is connected to a propeller shaft connected to the auxiliary drive wheels,
the transfer input shaft is disposed at a position on a rotational axis of the differential,
the transfer parallel shaft is disposed parallel to the transfer input shaft and at a radially outward position of the differential,
the bevel gear pair includes a pinion gear that is provided on the transfer output shaft and that is disposed at a position overlapping the gear case in the vehicle width direction, and
the transfer case wraps around from the other side surface to the rear surface as seen from above in a layout configuration of a front-side power transmission system to provide a space that is surrounded by a vehicle-rear end surface of the engine, a dash panel, and a vehicle body side panel.

7. The power transmission device according to claim 6, wherein
the transfer case includes
a power transmission mechanism that transmits power by changing a direction of an axis of rotation to an essentially orthogonal direction between the transfer input shaft and the transfer output shaft, and
a rotatable member of the power transmission mechanism that is provided on the transfer output shaft of the transfer case and that is disposed at a position overlapping the gear case in the vehicle width direction.

8. The power transmission device according to claim 5, wherein
the transfer case wraps around from the one side surface to the rear surface, as seen from above.

9. The power transmission device according to claim 6, wherein
the transfer case wraps around from the one side surface to the rear surface, as seen from above.

10. The power transmission device according to claim 5, wherein
the transfer case wraps around from the other side surface to the rear surface, as seen from above.

11. The power transmission device according to claim 6, wherein
the transfer case wraps around from the other side surface to the rear surface, as seen from above, and the transfer case is configured to output power to the auxiliary drive wheels from the rear surface side of the gear case.

\* \* \* \* \*